Jan. 26, 1965     G. ZETTL     3,166,826
METHOD OF MAKING AGRICULTURAL DEVICES
Filed May 1, 1963     9 Sheets-Sheet 1
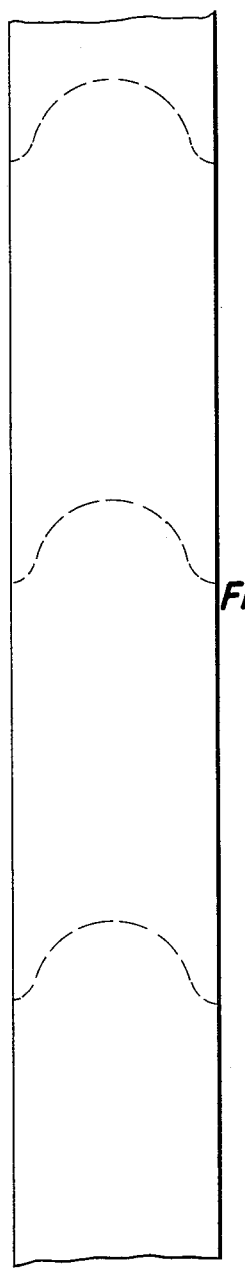
Fig.1
Fig.1a
PRIOR ART
Fig.2     Fig.2a
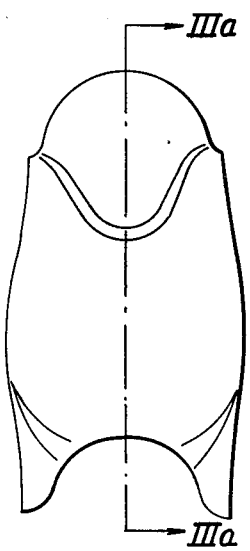
Fig.3     Fig.3a
Inventor:
Gustav Zettl
By Jan. 26, 1965   G. ZETTL   3,166,826
METHOD OF MAKING AGRICULTURAL DEVICES
Filed May 1, 1963   9 Sheets-Sheet 2

Inventor:
Gustav Zettl.

Jan. 26, 1965  G. ZETTL  3,166,826
METHOD OF MAKING AGRICULTURAL DEVICES
Filed May 1, 1963  9 Sheets-Sheet 5

PRIOR ART

Inventor:
Gustav Zettl
By
Walter Becker

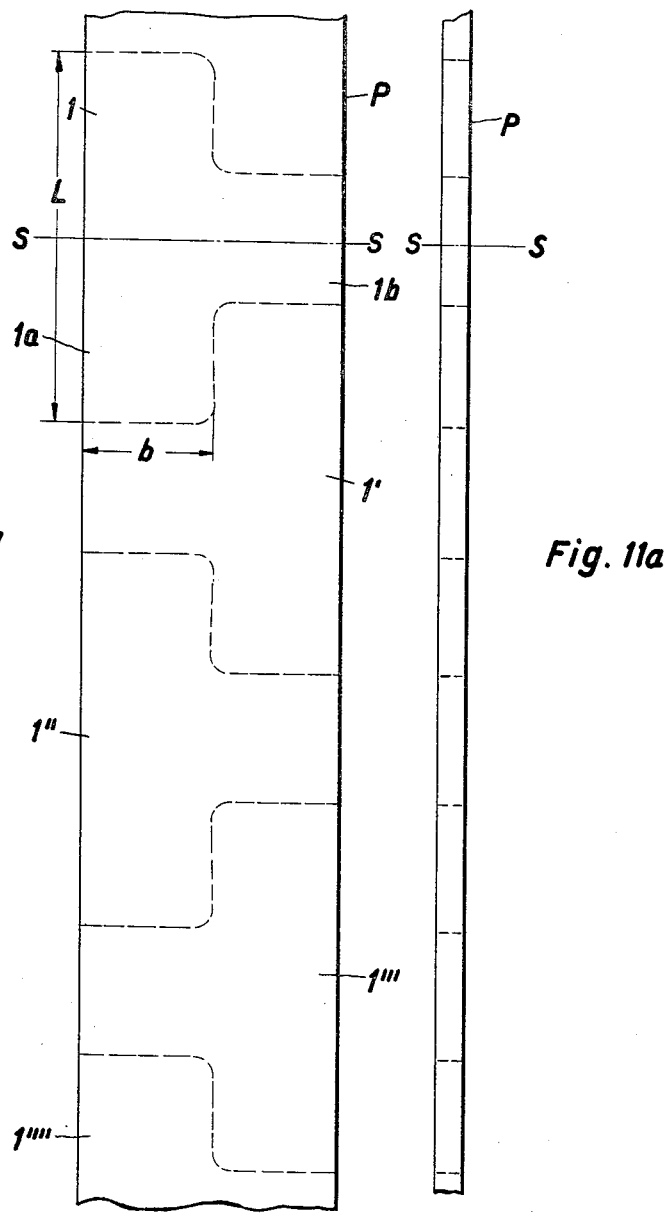

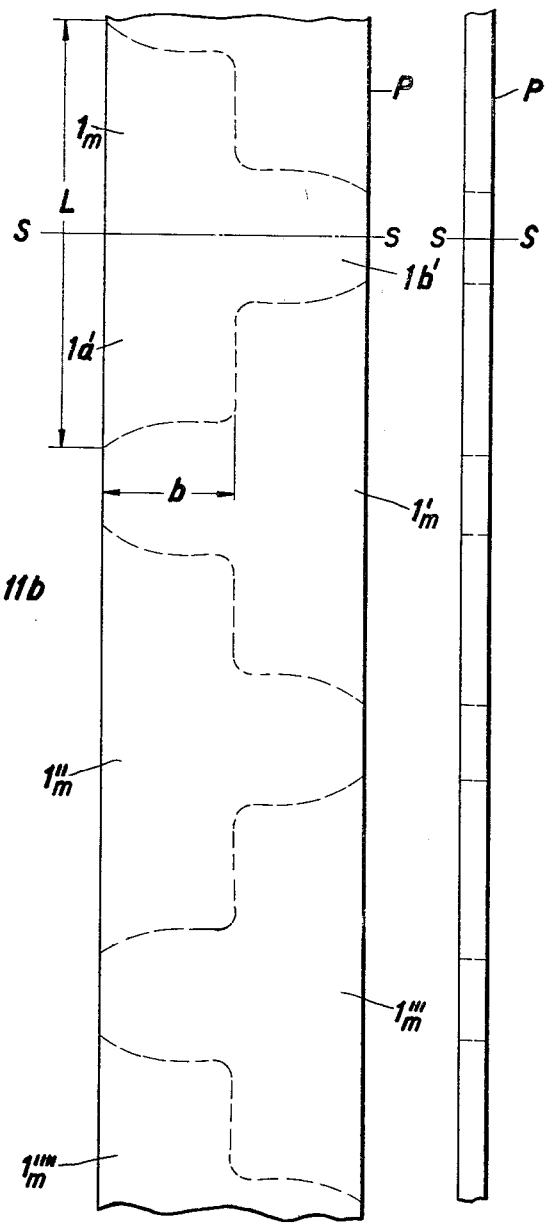

Jan. 26, 1965   G. ZETTL   3,166,826
METHOD OF MAKING AGRICULTURAL DEVICES
Filed May 1, 1963   9 Sheets-Sheet 8

Inventor:
Gustav Zettl
By [signature]

Jan. 26, 1965  G. ZETTL  3,166,828
METHOD OF MAKING AGRICULTURAL DEVICES
Filed May 1, 1963  9 Sheets-Sheet 9
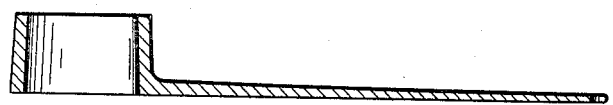
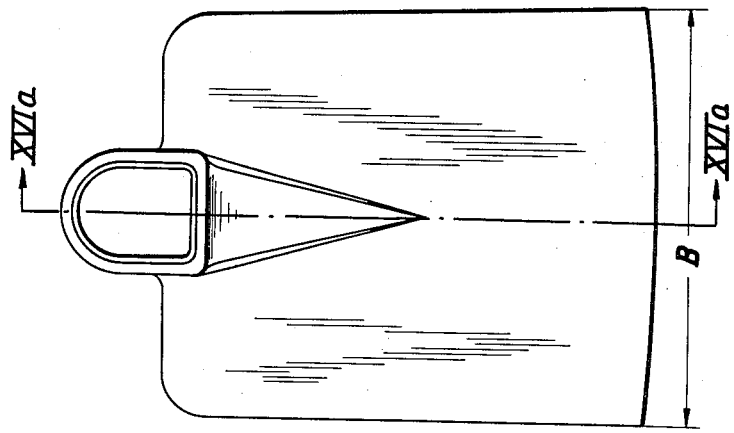
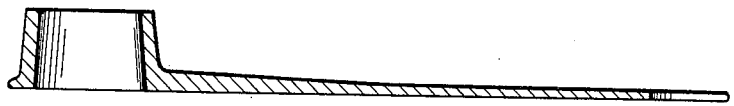
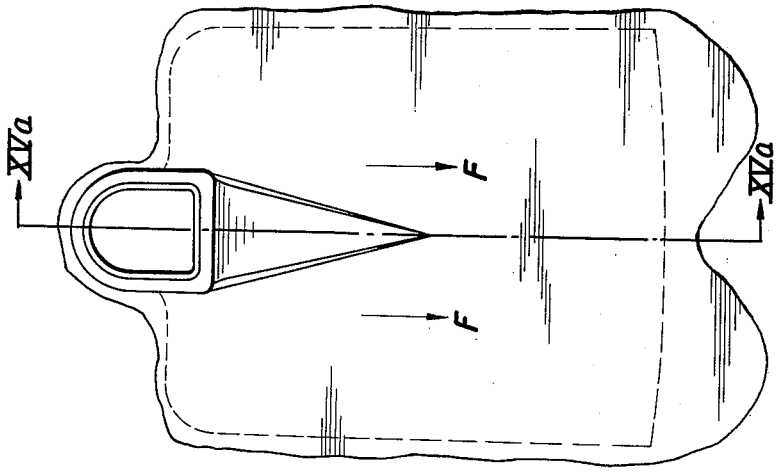
Inventor:
Gustav Zettl
By

United States Patent Office 3,166,826
Patented Jan. 26, 1965

3,166,826
METHOD OF MAKING AGRICULTURAL DEVICES
Gustav Zettl, Friedrichstal, Germany, assignor to Schwabische Huttenwerke G.m.b.H., Wasseralfingen, Wurttemberg, Germany
Filed May 1, 1963, Ser. No. 277,343
Claims priority, application Germany, May 3, 1962, Sch 31,399
4 Claims. (Cl. 29—148.3)

The present invention relates to a method of making agricultural devices, especially blade hoes.

It is an object of the present invention to provide an improved method of making hoes.

It is another object of this invention to provide a method of making hoes, which will require less starting material for the blank and which will make superfluous complicated operations such as broad rolling.

It is a further object of this invention to provide a method of making hoes with practically no waste of material.

These and other objects and advantages of the invention will appear more clearly from the following specification in connection with the accompanying drawings, in which:

FIGS. 1 to 10 illustrate various manufacturing phases of the heretofore known method of making hoes.

FIGS. 11 to 16 show various phases of making hoes in conformity with the present invention.

Referring first to FIGS. 1 to 10 illustrating the heretofore known method of making hoes, blanks are punched out from a plate shown in top and side view in FIGS. 1 and 1a respectively. These plates may have a length of about 6 meters. The blanks also have an approximately rectangular shape as will be evident from the contours in dash line in FIGS. 1, 1a and FIGS. 2 and 2a showing in top and side view a blank punched out from the plate shown in FIGS. 1, 1a.

These blanks are then heated and by means of a press are pre-pressed in two or three working operations as illustrated in FIGS. 3, 3a to 5, 5a showing the blank of FIGS. 2, 2a in top view and longitudinal section during three phases of the pressing operation. After completion of the third prepressing operation (FIG. 4 or 5), the plate has assumed a somewhat flat, broad shape and has been provided with a housing protruding from its plane which housing later on will form the sleeve section for receiving the stick or handle.

Figures 4, 4A:
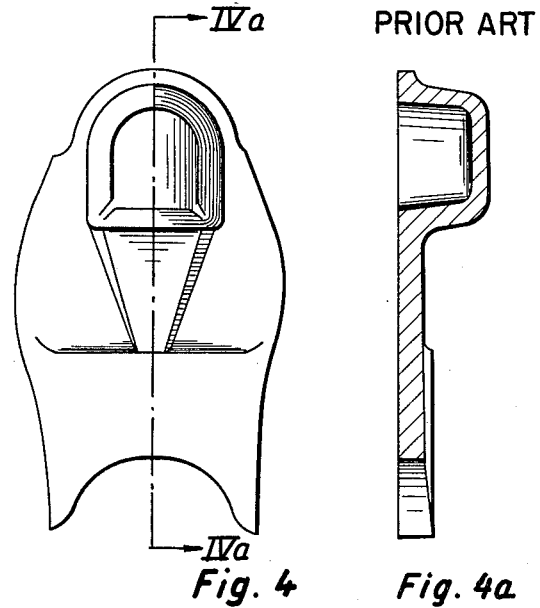
Figures 5, 5A:
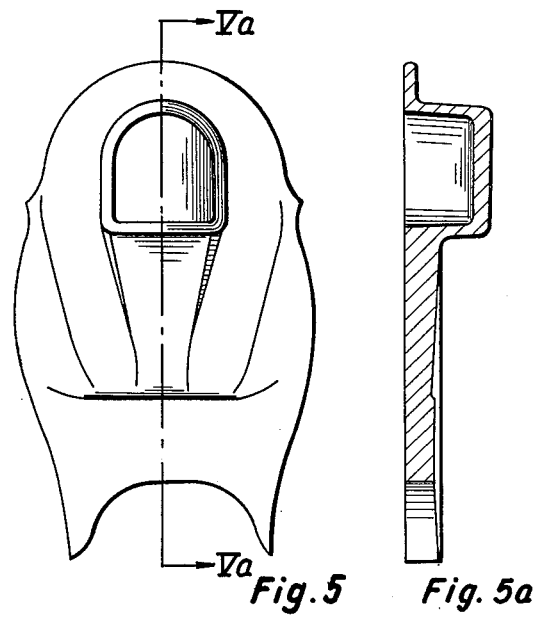
Figures 6, 6A:
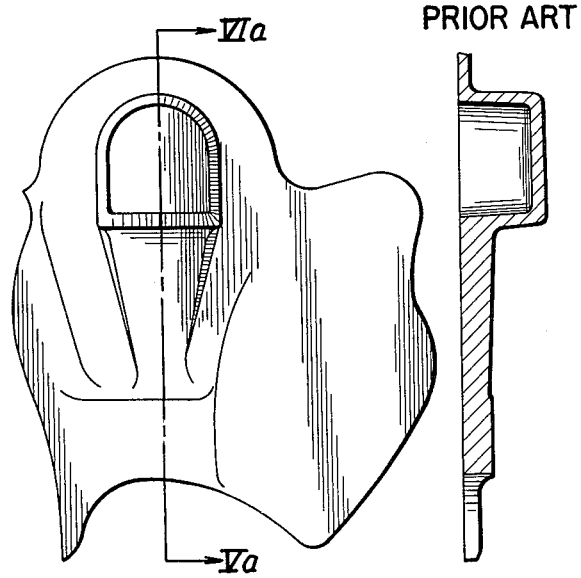
Figures 7, 7A:
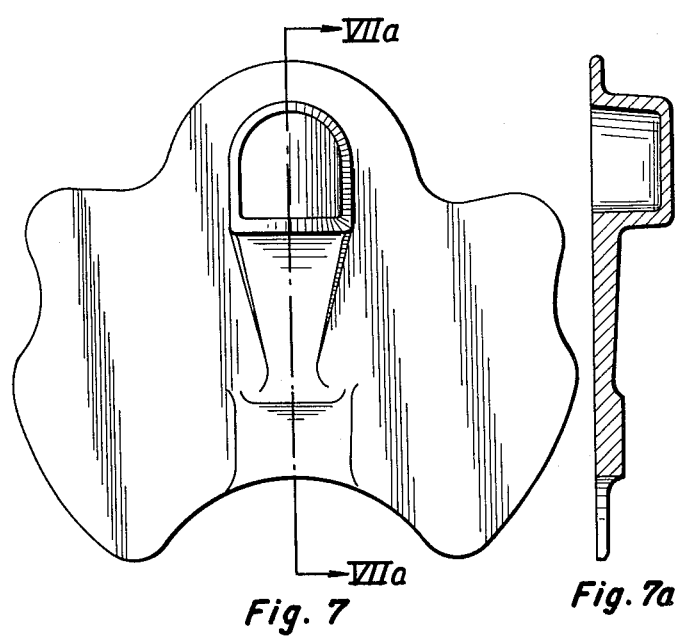
Figures 8, 8A:
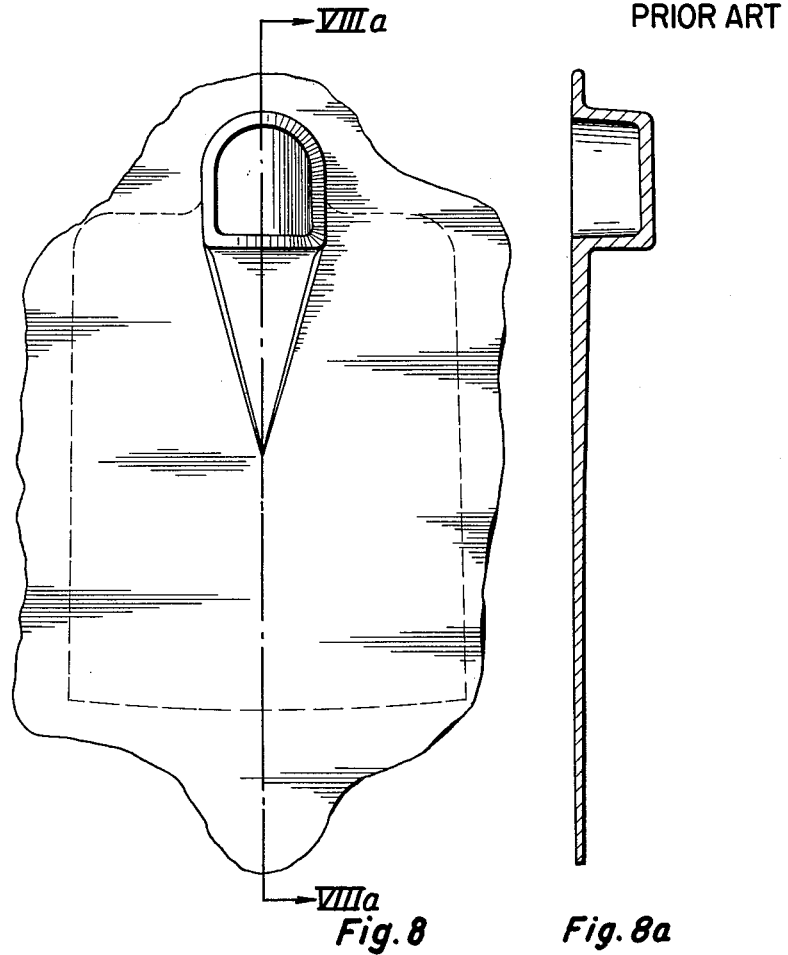

Inasmuch as the finished blade hoe is considerably wider than the blank from which it was started, in a plurality of rolling operations, first the necessary width at both sides of the longitudinal central axis of the blank is produced by rolling. A blank having been subjected to these operations is illustrated in top view and longitudinal section in FIGS. 6, 6a and 7, 7a. Subsequently, after turning the blank by 90°, the required longitudinal stretching is produced by rolling as shown in FIGS. 8 and 8a respectively illustrating the rolled blank in top view and longitudinal section.

Figure 9:
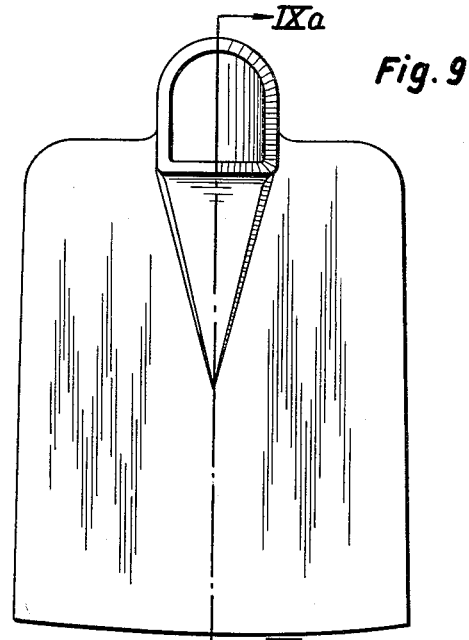
Figure 9A:
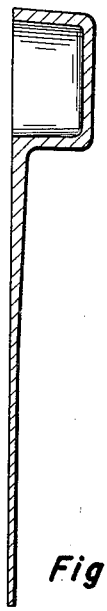
Figure 10:
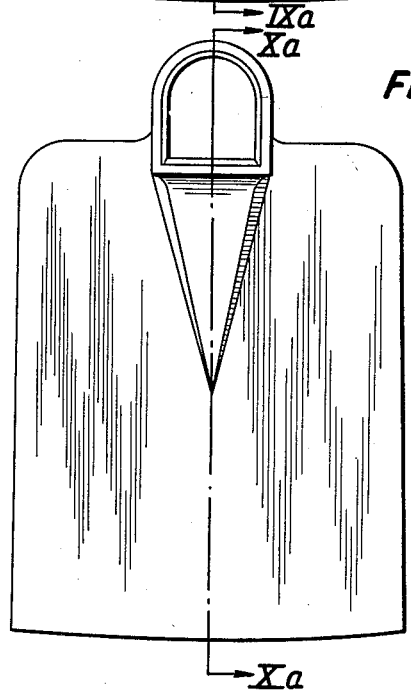
Figure 10A:
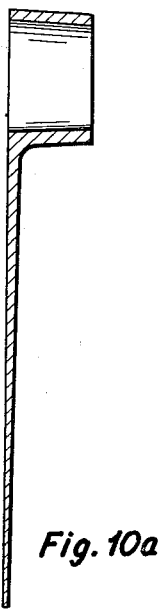

Thereupon, while the blank is still hot, the housing is de-burred, and the blade is given the final shape (see FIGS. 9 and 9a showing the hoe in top view and longitudinal section respectively). Finally, the bottom of the housing is perforated (FIGS. 10, 10a) by means of a punching operation. While the blade is still hot, it is arched to the desired extent, hardened, ground, polished, and painted.

As will be evident from the above, with the heretofore known method of making blade hoes, the blank must have as much excess material as the finished product so that with the various forging operations, it will be assured that the final hoe shape can be punched from the forged unfinished blade. A further drawback of the abovementioned heretofore known method consists in that the approximately rectangular starting blank with one and the same heating operation, has to be rolled to the necessary width and subsequently to the correct length, while the blank which has been first stretched as to width has to be turned over during the rolling operation. These operations can, as a rule, be carried out only by an experienced and more-than-average skilled operator. Inasmuch as the relatively long rolling operation is rather complicated, a relatively high rate of waste is unavoidable, in spite of the skill of the operator.

According to the present invention, the manufacturing process of making a hoe starts with a blank the maximum width of which corresponds substantially to the width of the finished hoe, while above the approximately rectangular blade portion in the central portion of its greatest width, there is provided a likewise rectangular, preferably square-shaped extension from which the housing or sleeve will be made for receiving the stick or handle. These portions are arranged symmetrically with regard to the longitudinal axis of the blank.

Preferably, the blade blank which has its longitudinal extension in the direction transverse to the longitudinal axis of a blank strip may be a few millimeters less than the width of the finished blade. The housing blank section which is connected to the blade blank section has such a volume as is required for the final forming of the housing, while taking into consideration various housing shapes.

The blank form of the hoe is worked out from a blank plate in such a way that no waste will be produced. This result is obtained by arranging the individual blanks in the plate so that they are alternately offset to each other by 180°. The blank according to the invention, after being punched out is, in a manner known per se, heated and placed under a press. By subdividing the blank in a housing blank section and in a blade blank section, it will be obtained that during the pressing operation, the cut edges of the housing blank section can, without cutting off the course of their grain, be shaped to the final housing shape by slightly folding them upwardly, so that considerable forming operation will be saved.

While with the heretofore known manufacturing process, the approximately rectangular blank had to be stretched under the press in the direction of the width of the hoe, this deforming operation can be saved so that during the pressing operation no material deforming operation of the blade blank section will be required.

More specifically referring to the present method, FIGS. 11, 11a and 11b, 11c illustrate in top and side view respectively a plate P for which blanks are punched out the contours of which are indicated in dash lines. The blanks 1, 1' to 1'''' and $1_m$, $1'_m$ to $1''''_m$ are shaped so that each blank has its sections symmetrically arranged with regard to its axis of symmetry S—S which is substantially perpendicular to the longitudinal direction of the plate P. The individual blanks each comprise an approximately rectangular blade section $1a$ similar to the hoe blade, and an approximately square or rectangular shaped housing section $1b$ (see FIG. 12). The shape indicated in dash lines in FIGS. 11b, 11c is advantageous with a housing section having a rounded roof, whereas the more straight edge shape is suitable for a flat housing roof. The length L of the blade section $1a$ measured in longitudinal direction of plate P corresponds approximately to the width B (see FIG. 16 of the finished hoe blade), whereas the blade portion $1a$ of blank 1 has a width $b$ which is approximately half the width of the plate P. Arranged on blade section $1a$ is the housing section $1b$ which is likewise symmetrically arranged with regard to the axis of symmetry S—S and has a plan view corresponding to the housing for the handle. The housing section 1b must have such a volume as is required for the final forming of the housing.

The blanks composed of blade section 1a and housing section 1b are, over the length of plate P, alternately offset by 180° with regard to each other, while adjacent blanks 1, 1'; 1', 1''; 1'', 1'''; 1''', 1'''' have a common borderline so that they can be punched out of the plate without any waste.

Figure 12:
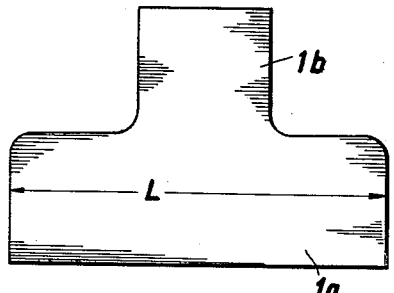
Figure 12A:
Figure 13:
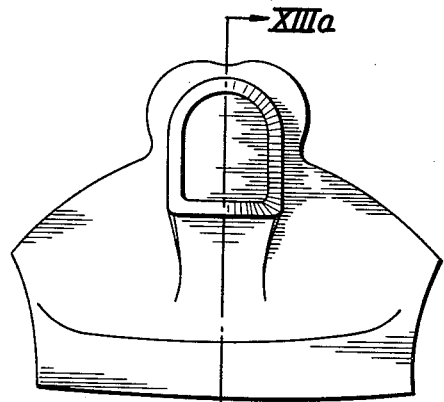
Figure 13A:
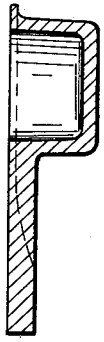
Figure 14:
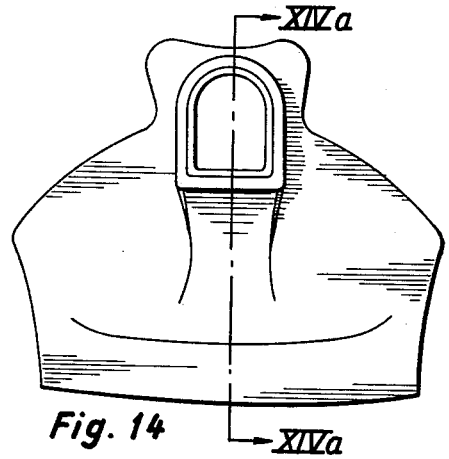
Figure 14A:
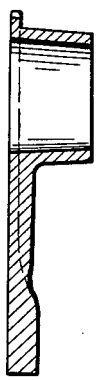

FIGS. 12, 12a show in top view and longitudinal section respectively a punched-out blank comprising a blank section 1a and a housing section 1b. The further manufacturing steps are illustrated in FIGS. 13, 13a to 16, 16a respectively showing the blank of FIGS. 12, 12a in top view and longitudinal section. After being heated, this blank is placed in a press and first (see FIGS. 13, 13a) the housing section 1b is shaped out of the blank plane in such a way that the desired housing 2 will be produced in conformity with its desired circumference and its desired depth. During a second pressing operation, the housing 2 will be perforated (FIGS. 14, 14a). This finishes, for the time being, the shaping of the housing portion. During the next working operation, the thus perforated blank is, in conformity with FIGS. 15, 15a, rolled in longitudinal direction as indicated by the arrows F in FIG. 15, while the perforated housing 2 forms a fixed guide inasmuch as during the rolling, it is placed on a corresponding device. In this way, the heretofore encountered great number of misformations according to which the ribs of the blade are not located in the longitudinal central plane, will be avoided.

Generally, with the method according to the present invention, only two longitudinal rolling operations, i.e. a two-time passage of the blank through the rollers equipped, for instance, with segments, are required in order to shape the blank to its final length (see FIGS. 15, 15a). During the subsequent de-burring or trimming (FIGS. 16, 16a) the only-slightly-protruding burr is removed so that, subsequently thereto, the blade can, while under the same residual heat, be given the final curved shape. The remaining working operations such as grinding and polishing are carried out in the heretofore known manner.

As will be evident from the above, the present invention provides a method of making hoes, according to which less starting material for the blank is required than was necessary with heretofore known manufacturing methods for the purpose involved. In addition thereto, no complicated working operation as, for instance, broad rolling, is required. Thus, in addition to saving considerable material, the method according to the present invention also makes it possible to employ unskilled labor for the manufacturing process.

It is, of course, to be understood that the present invention is, by no means, limited to the particular method described in connection with the drawings, but also comprises any modifications within the scope of the appended claims.

What I claim is:

1. A method of making agricultural devices, which includes the steps of: stamping out a plurality of substantially identical blanks from a relatively long and narrow blank strip, each blank having a substantially rectangular blade section of approximately the width of the final blade to be made and having a housing section of approximately square-shaped cross section for receiving the handle, heating the stamped out blanks, deep drawing the housing section of a respective stamped out heated blank to form a cup-shaped portion, removing the bottom of said cup shaped portion to transform the latter into a sleeve for receiving a handle, hot rolling the blade section of the respective blank in longitudinal direction of the blank by segmented rolls utilizing the residual heat in the blank to form a tapered blank, trimming the blank into approximately final shape, curving the blank while utilizing the residual heat therein, and grinding and polishing the blank.

2. The method according to claim 1 in which the hot rolling of the blade section consists of two rolling operations.

3. The method according to claim 2 in which the total width of said blade and housing sections equals the width of said blank strip, said stamping out operation being carried out in such a way that when looking in longitudinal direction of the blank strip the blanks will be located one behind the other but with the housing section alternately located on different sides of the blank strip, the blanks being so shaped that a plane of symmetry of each blank extending in transverse direction of said strip bisects both said rectangular and said housing section of each blank.

4. The method according to claim 3 in which each two adjacent blanks prior to being stamped out have a common contour line so that no scrap is removed from said strip.

References Cited by the Examiner

UNITED STATES PATENTS

| 139,535 | 6/73 | Behel | 29—14 |
| 165,581 | 7/75 | Holmes | 29—14 |
| 510,047 | 12/93 | Pfefferkorn | 29—415 X |
| 1,890,471 | 12/32 | Rutherford | 29—415 X |

WHITMORE A. WILTZ, *Primary Examiner.*

THOMAS H. EAGER, *Examiner.*